(12) United States Patent
Zhang et al.

(10) Patent No.: US 12,206,602 B2
(45) Date of Patent: Jan. 21, 2025

(54) COMMUNICATION METHOD, TERMINAL AND NETWORK DEVICE

(71) Applicants: CHINA MOBILE COMMUNICATION CO., LTD RESEARCH INSTITUTE, Beijing (CN); CHINA MOBILE COMMUNICATIONS GROUP CO., LTD., Beijing (CN)

(72) Inventors: Xiaoran Zhang, Beijing (CN); Nan Hu, Beijing (CN); Zhe Shao, Beijing (CN); Ningyu Chen, Beijing (CN); Nan Li, Beijing (CN)

(73) Assignees: CHINA MOBILE COMMUNICATION CO., LTD RESEARCH INSTITUTE, Beijing (CN); CHINA MOBILE COMMUNICATIONS GROUP CO., LTD., Beijing (CN)

( * ) Notice: Subject to any disclaimer, the term of this patent is extended or adjusted under 35 U.S.C. 154(b) by 433 days.

(21) Appl. No.: 17/598,723

(22) PCT Filed: Mar. 25, 2020

(86) PCT No.: PCT/CN2020/081189
§ 371 (c)(1),
(2) Date: Sep. 27, 2021

(87) PCT Pub. No.: WO2020/200013
PCT Pub. Date: Oct. 8, 2020

(65) Prior Publication Data
US 2022/0190978 A1 Jun. 16, 2022

(30) Foreign Application Priority Data
Mar. 29, 2019 (CN) .......................... 201910251273.6

(51) Int. Cl.
H04W 24/04 (2009.01)
H04L 5/00 (2006.01)
(Continued)

(52) U.S. Cl.
CPC .......... *H04L 5/0007* (2013.01); *H04L 5/0053* (2013.01); *H04W 24/04* (2013.01);
(Continued)

(58) Field of Classification Search
None
See application file for complete search history.

(56) References Cited

U.S. PATENT DOCUMENTS

2015/0282165 A1  10/2015  Ni et al.
2017/0055297 A1   2/2017  Da Ren
(Continued)

FOREIGN PATENT DOCUMENTS

CN    102448148 A    5/2012
CN    104854811 A    8/2015
(Continued)

OTHER PUBLICATIONS

"Discussion on NR Channel Raster and Sync Raster", May 2017, Source: Samsung, 3GPP TSG-RAN WG4 Meeting #83, R4-1704772, Hangzhou, China, 5 pgs.
(Continued)

*Primary Examiner* — Pamit Kaur
(74) *Attorney, Agent, or Firm* — Cooper Legal Group, LLC

(57) ABSTRACT

Disclosed are a communication method, a terminal and a network device. The method comprises: indicating a frequency range identifier corresponding to a frequency range, the frequency range identifier comprising at least one of the following: a first frequency range identifier, wherein the first frequency range identifier represents that a system works in
(Continued)

Indication information is sent to a terminal, the indication information including at least one of the following: a frequency band indicator, an uplink transmission shift identifier, or a cell reservation identifier — 201 the frequency range and an uplink transmission offset is 0; a second frequency range identifier, wherein the second frequency range identifier represents that the system works in the frequency range, and the uplink transmission offset is 7.5 kHz; a third frequency range identifier, wherein the third frequency range identifier represents that the system works in the frequency range and the uplink transmission offset is 7.5 kHz or 0; and a fourth frequency range identifier, wherein the fourth frequency range identifier represents that the system works in the frequency range.

11 Claims, 3 Drawing Sheets

(51) Int. Cl.
H04W 48/08 (2009.01)
H04W 72/0453 (2023.01)
H04W 72/23 (2023.01)

(52) U.S. Cl.
CPC ....... *H04W 48/08* (2013.01); *H04W 72/0453* (2013.01); *H04W 72/23* (2023.01)

(56) References Cited

U.S. PATENT DOCUMENTS

| | | | |
|---|---|---|---|
| 2018/0255553 A1* | 9/2018 | Gaal | H04L 5/0007 |
| 2018/0317185 A1 | 11/2018 | Chen et al. | |
| 2019/0141709 A1 | 5/2019 | Gaal et al. | |
| 2019/0342130 A1 | 11/2019 | Sun et al. | |
| 2020/0028658 A1* | 1/2020 | Baldemair | H04L 5/1469 |
| 2021/0007098 A1 | 1/2021 | Gaal et al. | |
| 2021/0160121 A1* | 5/2021 | Jeon | H04J 11/0023 |

FOREIGN PATENT DOCUMENTS

| | | |
|---|---|---|
| CN | 105659678 A | 6/2016 |
| CN | 105684538 A | 6/2016 |
| CN | 106332286 A | 1/2017 |
| CN | 106538008 A | 3/2017 |
| CN | 106961734 A | 7/2017 |
| CN | 107925499 A | 4/2018 |
| CN | 108141816 A | 6/2018 |
| CN | 108200650 A | 6/2018 |
| CN | 108365927 A | 8/2018 |
| CN | 108366030 A | 8/2018 |
| CN | 108432318 A | 8/2018 |
| CN | 108631976 A | 10/2018 |
| CN | 108811090 A | 11/2018 |
| CN | 109219130 A | 1/2019 |
| CN | 109391446 A | 2/2019 |
| JP | 2020507259 A | 3/2020 |
| JP | 2020509701 A | 3/2020 |
| WO | 2018137574 A1 | 8/2018 |
| WO | 2018174808 A1 | 9/2018 |
| WO | 2018232367 A1 | 12/2018 |

OTHER PUBLICATIONS

"Remaining Details on Synchronization Signal", Feb. 2018, Source: Huawei, HiSilicon, 3GPP TSG RAN WG1 Meeting #92. R1-1801327, Athens, Greece, 11 pgs.

Notice of Allowance of the Chinese application No. 201910251273.6, issued on Apr. 19, 2022, 8 pgs.

"NB-IoT and NR Coexistence: Channel Raster and RB Alignment", Feb. 2019, Source: Ericsson, 3GPP TSG-RAN WG4 Meeting #90, R4-1901400, 3rd Generation Partnership Project (3GPP), Athens, Greece, 11 pgs.

Supplementary European Search Report in European application No. 20782219.8, mailed on Apr. 26, 2022, 14 pgs.

International Search Report in the international application No. PCT/CN2020/081189, mailed on Jun. 29, 2020, 2 pgs.

English translation of the Written Opinion of the International Search Authority in the international application No. PCT/CN2020/081189, mailed on Jun. 29, 2020, 4 pgs.

\* cited by examiner

COMMUNICATION METHOD, TERMINAL AND NETWORK DEVICE

CROSS-REFERENCE TO RELATED APPLICATIONS

This is a national phase application of International Application No. PCT/CN2020/081189, filed on Mar. 25, 2020, which is based upon and claims priority to Chinese Patent Application No. 201910251273.6, filed on Mar. 29, 2019. The disclosures of International Application No. PCT/CN2020/081189 and Chinese Patent Application No. 201910251273.6 are hereby incorporated by reference in their entireties.

TECHNICAL FIELD

The present disclosure relates to the technical field of wireless communication, and in particular to a communication method, a terminal and a network device.

BACKGROUND

In the fifth generation mobile communication network (5G) system, Long Term Evolution (LTE) and New Radio (NR) coexistence technologies are introduced. That is, LTE and NR are dynamically shared over the same spectrum resources. Due to the design difference between the NR and the LTE, an uplink carrier deviation between the NR and the LTE is 7.5 kilohertz (kHz). Therefore, when LTE and NR networks coexist, an uplink carrier of the NR needs to be shifted by 7.5 kHz to avoid large interference on a network side upon receiving.

The network side sends an indication of whether the shift is 7.5 kHz through broadcasting. If the indication is read by a terminal supporting the shift of 7.5 kHz, it is determined whether the corresponding shift is performed during uplink transmission according to the indication. However, a terminal which does not support the shift of 7.5 kHz cannot read the indication, if the terminal directly accesses the coexistence network, the terminal does not perform the corresponding shift during uplink transmission and thus generates large interference on a receiving side, thereby affecting the reception of the network side.

SUMMARY

Embodiments of the present disclosure provide a communication method, a terminal and a network device.

The technical solutions of the embodiments of the present disclosure are implemented as follows.

According to a first aspect, the embodiments of the present disclosure provide a communication method, which may include the following operation. A frequency band indicator corresponding to a frequency range is indicated. The frequency band indicator includes at least one of the following: a first frequency band indicator representing that a system operates in the frequency range and an uplink transmission shift is 0; a second frequency band indicator representing that the system operates in the frequency range and the uplink transmission shift is 7.5 kHz; a third frequency band indicator representing that the system operates in the frequency range and the uplink transmission shift is 7.5 kHz or 0; or a fourth frequency band indicator representing that the system operates in the frequency range.

In some alternative embodiments of the present disclosure, the method may further include that: the frequency band indicator is sent to a terminal.

In some alternative embodiments of the present disclosure, the operation of sending the frequency band indicator to the terminal may include that: the frequency band indicator is sent to the terminal through Radio Resource Control (RRC) signaling.

In some alternative embodiments of the present disclosure, in a case that the frequency band indicator includes the third frequency band indicator, the method may further include that: configuration information is sent to the terminal. The configuration information is used for indicating the uplink transmission with a 7.5 kHz shift or indicating that the uplink transmission shift is 0.

In some alternative embodiments of the present disclosure, the operation of sending the configuration information to the terminal may include that: the configuration information is sent to the terminal through RRC signaling.

According to a second aspect, the embodiments of the present disclosure also provide a communication method, which may include the following operation. Indication information is sent to a terminal. The indication information includes at least one of the following: a frequency band indicator, an uplink transmission shift identifier, or a cell reservation identifier, and the indication information is used for instructing the terminal to perform cell-directed behaviors.

In some alternative embodiments of the present disclosure, the frequency band indicator may include at least one of the following: a first frequency band indicator representing that a system operates in the frequency range and an uplink transmission shift is 0; a second frequency band indicator representing that the system operates in the frequency range and the uplink transmission shift is 7.5 kHz; a third frequency band indicator representing that the system operates in the frequency range and the uplink transmission shift is 7.5 kHz or 0; or a fourth frequency band indicator representing that the system operates in the frequency range.

In some alternative embodiments of the present disclosure, the operation of sending the indication information to the terminal may include that: the indication information is sent to the terminal through RRC signaling.

In some alternative embodiments of the present disclosure, in a case that the frequency band indicator includes the third frequency band indicator, the method may further include that: configuration information is sent to the terminal. The configuration information is used for indicating the uplink transmission with a 7.5 kHz shift or indicating the uplink transmission shift is 0.

In some alternative embodiments of the present disclosure, the operation of sending the configuration information to the terminal may include that: the configuration information is sent to the terminal through RRC signaling.

According to a third aspect, the embodiments of the present disclosure also provide a communication method, which may include the following operation. Indication information is received from a network device. The indication information includes at least one of the following information: a frequency band indicator, an uplink transmission shift identifier, or a cell reservation identifier, and the indication information is used for instructing the terminal to perform cell-directed behaviors.

In some alternative embodiments of the present disclosure, the frequency band indicator may include at least one of the following: a first frequency band indicator representing that a system operates in the frequency range and an uplink transmission shift is 0; a second frequency band indicator representing that the system operates in the frequency range and the uplink transmission shift is 7.5 kHz; a third frequency band indicator representing that the system operates in the frequency range and the uplink transmission shift is 7.5 kHz or 0; or a fourth frequency band indicator representing that the system operates in the frequency range.

In some alternative embodiments of the present disclosure, the operation that the terminal receives the indication information from the network device may include that: the terminal receives the indication information from the network device through RRC signaling.

In some alternative embodiments of the present disclosure, in a case that the frequency band indicator includes the third frequency band indicator, the method may further include that: configuration information is received from the network device. The configuration information is used for indicating the uplink transmission with a 7.5 kHz shift or indicating that the uplink transmission shift is 0.

In some alternative embodiments of the present disclosure, the operation of receiving the configuration information from the network device may include that: the configuration information is received from the network device through RRC signaling.

In some alternative embodiments of the present disclosure, the method may further include that one of the following behaviors is performed: in a case that the terminal does not support the frequency band indicator in the indication information, determining that a cell corresponding to the frequency band indicator is unable to be camped on; and in a case that the terminal supports the frequency band indicator in the indication information, determining whether to enable the uplink transmission shift based on information related to the uplink transmission shift in the indication information.

In some alternative embodiments of the present disclosure, in a case that the terminal supports the frequency band indicator in the indication information and does not support the uplink transmission shift, one of the following behaviors may be performed: when the indication information does not include the uplink transmission shift, performing uplink transmission with disabling the uplink transmission shift; when the indication information includes the uplink transmission shift, determining that a cell is unable to be camped on; and when the cell reservation identifier in the indication information represents that an identified cell is reserved, determining that the cell is unable to be camped on.

In some alternative embodiments of the present disclosure, in a case that the terminal supports the frequency band indicator in the indication information and supports the uplink transmission shift, one of the following behaviors may be performed: when the indication information does not include the uplink transmission shift, performing uplink transmission with disabling the uplink transmission shift; and when the indication information includes the uplink transmission shift or the indication information includes the uplink transmission shift and the cell reservation identifier represents that an identified cell is reserved, performing an uplink shift of 7.5 kHz while performing uplink transmission.

According to a fourth aspect, the embodiments of the present disclosure provide a network device, which may include an indication unit. The indication unit is configured to indicate a frequency band indicator corresponding to a frequency range. The frequency band indicator includes at least one of the following: a first frequency band indicator representing that a system operates in the frequency range and an uplink transmission shift is 0; a second frequency band indicator representing that the system operates in the frequency range and the uplink transmission shift is 7.5 kHz; a third frequency band indicator representing that the system operates in the frequency range and the uplink transmission shift is 7.5 kHz or 0; or a fourth frequency band indicator representing that the system operates in the frequency range.

In some alternative embodiments of the present disclosure, the network device may further include a first communication unit. The first communication unit is configured to send the frequency band indicator to a terminal.

In some alternative embodiments of the present disclosure, the first communication unit may be configured to send the frequency band indicator to the terminal through RRC signaling.

In some alternative embodiments of the present disclosure, the first communication unit may be configured to send configuration information to the terminal in a case that the frequency band indicator includes the third frequency band indicator, the configuration information being used for indicating the uplink transmission with a 7.5 kHz shift or indicating that the uplink transmission shift is 0.

In some alternative embodiments of the present disclosure, the first communication unit may be configured to send the configuration information to the terminal through RRC signaling.

According to a fifth aspect, the embodiments of the present disclosure also provide a network device, which may include a second communication unit. The second communication unit is configured to send indication information to a terminal. The indication information includes at least one of the following information: a frequency band indicator, an uplink transmission shift identifier, or a cell reservation identifier, and the indication information is used for instructing the terminal to perform cell-directed behaviors.

In some alternative embodiments of the present disclosure, the frequency band indicator may include at least one of the following: a first frequency band indicator representing that a system operates in the frequency range and an uplink transmission shift is 0; a second frequency band indicator representing that the system operates in the frequency range and the uplink transmission shift is 7.5 kHz; a third frequency band indicator representing that the system operates in the frequency range and the uplink transmission shift is 7.5 kHz or 0; or a fourth frequency band indicator representing that the system operates in the frequency range.

In some alternative embodiments of the present disclosure, the second communication unit may be configured to send the indication information to the terminal through RRC signaling.

In some alternative embodiments of the present disclosure, the second communication unit may be further configured to send configuration information to the terminal in a case that the frequency band indicator includes the third frequency band indicator, the configuration information being used for indicating the uplink transmission with a 7.5 kHz shift or indicating that the uplink transmission shift is 0.

In some alternative embodiments of the present disclosure, the second communication unit may be configured to send the configuration information to the terminal through RRC signaling.

According to a sixth aspect, the embodiments of the present disclosure also provide a terminal, which may include a third communication unit. The third communication unit is configured to receive indication information from a network device. The indication information includes at least one of the following information: a frequency band indicator, an uplink transmission shift identifier, or a cell reservation identifier, and the indication information is used for instructing a terminal to perform cell-directed behaviors.

In some alternative embodiments of the present disclosure, the frequency band indicator may include at least one of the following: a first frequency band indicator representing that a system operates in the frequency range and an uplink transmission shift is 0; a second frequency band indicator representing that the system operates in the frequency range and the uplink transmission shift is 7.5 kHz; a third frequency band indicator representing that the system operates in the frequency range and the uplink transmission shift is 7.5 kHz or 0; or a fourth frequency band indicator representing that the system operates in the frequency range.

In some alternative embodiments of the present disclosure, the third communication unit may be configured to receive indication information sent by the network device through RRC signaling.

In some alternative embodiments of the present disclosure, the third communication unit may further be configured to receive configuration information sent by the network device in a case that the frequency band indicator includes the third frequency band indicator, the configuration information being used for indicating the uplink transmission with a 7.5 kHz shift or indicating that the uplink transmission shift is 0.

In some alternative embodiments of the present disclosure, the third communication unit may be configured to receive the configuration information sent by the network device through RRC signaling.

In some alternative embodiments of the present disclosure, the terminal may further include a processing unit. The processing unit is configured to perform one of the following: in a case that the terminal does not support the frequency band indicator in the indication information, determining that a cell corresponding to the frequency band indicator is unable to be camped on; and in a case that the terminal supports the frequency band indicator in the indication information, determining whether to enable the uplink transmission shift based on information related to the uplink transmission shift in the indication information.

In some alternative embodiments of the present disclosure, the processing unit may be configured to perform one of the following behaviors in a case that the terminal supports the frequency band indicator in the indication information and does not support the uplink transmission shift: when the indication information does not include the uplink transmission shift, performing uplink transmission with disabling the uplink transmission shift; when the indication information includes the uplink transmission shift, determining that a cell is unable to be camped on; and when the cell reservation identifier in the indication information represents that an identified cell is reserved, determining that the cell is unable to be camped on.

In some alternative embodiments of the present disclosure, the processing unit may be configured to perform one of the following behaviors in a case that the terminal supports the frequency band indicator in the indication information and supports the uplink transmission shift: when the indication information does not include the uplink transmission shift, performing uplink transmission with disabling the uplink transmission shift; and when the indication information includes the uplink transmission shift or the indication information includes the uplink transmission shift and the cell reservation identifier represents that an identified cell is reserved, performing an uplink shift of 7.5 kHz while performing uplink transmission.

According to a seventh aspect, the embodiments of the present disclosure also provide a computer-readable storage medium having a computer program stored thereon. The program, when executed by a processor, may implement the operations of the method in the first aspect, the second aspect or the third aspect of the embodiments of the present disclosure.

According to an eighth aspect, the embodiments of the present disclosure also provide a network device, which may include: a memory, a processor, and a computer program stored on the memory and operable on the processor. The processor, when executing the program, may implement the operations of the method in the first aspect or the second aspect of the embodiments of the present disclosure.

According to a ninth aspect, the embodiments of the present disclosure also provide a terminal, which may include: a memory, a processor, and a computer program stored on the memory and operable on the processor. The processor, when executing the program, may implement the operations of the method in the third aspect of the embodiments of the present disclosure.

The embodiments of the present disclosure have the following beneficial effects.

According to the technical solutions of the embodiments of the present disclosure, on one hand, different frequency band indicators are indicated for the same frequency range or overlapping frequency ranges, and the different frequency band indicators may be used for indicating whether the frequency range has an uplink transmission shift. On the other hand, indication information is sent to a terminal through a network device. The indication information includes at least one of the following: a frequency band indicator, an uplink transmission shift identifier or a cell reservation identifier, so that the terminal may perform cell-directed behaviors at least based on the frequency band indicator, or perform cell-directed behaviors based on the indication of the indication information, thereby avoiding the situation that a terminal which does not support an uplink carrier shift of 7.5 kHz accesses an LTE and NR coexistence network, and avoiding large interference generated by a network side upon receiving.

DETAILED DESCRIPTION

The present disclosure will be further described in detail below with reference to the accompanying drawings and specific embodiments.

Figure 1:
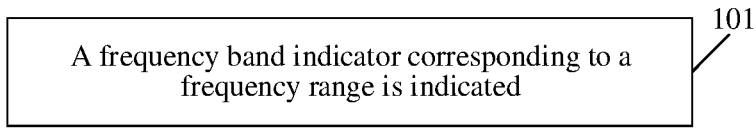
FIG. 1 is a schematic flowchart of a communication method according to an embodiment of the present disclosure.

An embodiment of the present disclosure provides a communication method, which is applied to a network device. FIG. 1 is a schematic flowchart of a communication method according to an embodiment of the present disclosure. As shown in FIG. 1, the method includes the following operations.

In 101, a frequency band indicator corresponding to a frequency range is indicated. The frequency band indicator includes at least one of the following:
 a first frequency band indicator representing that a system operates in the frequency range and an uplink transmission shift is 0;
 a second frequency band indicator representing that the system operates in the frequency range and the uplink transmission shift is 7.5 kHz;
 a third frequency band indicator representing that the system operates in the frequency range and the uplink transmission shift is 7.5 kHz or 0; or
 a fourth frequency band indicator representing that the system operates in the frequency range.

In the present embodiment, the network device indicates different frequency band indicators for the same frequency range or overlapping frequency ranges. Different frequency ranges have different meanings. As an example, different frequency band indicators may be used to indicate whether the frequency range has an uplink transmission shift, so that after the network device sends the frequency band indicator to a terminal, the terminal may perform cell-directed behaviors at least based on the frequency band indicator.

In an alternative embodiment of the present disclosure, the method further includes that: the frequency band indicator is sent to a terminal. Alternatively, the operation of sending the frequency band indicator to the terminal includes that: the frequency band indicator is sent to the terminal through RRC signaling.

In an alternative embodiment of the present disclosure, in a case that the frequency band indicator includes the third frequency band indicator, the method further includes that: configuration information is sent to the terminal. The configuration information is used for indicating the uplink transmission with a 7.5 kHz shift or indicating that the uplink transmission shift is 0. Alternatively, the operation of sending configuration information to the terminal includes that: the configuration information is sent to the terminal through RRC signaling.

According to the technical solutions of the embodiments of the present disclosure, different frequency band indicators are indicated for the same frequency range or overlapping frequency ranges, and the different frequency band indicators may be used for indicating whether the frequency range has an uplink transmission shift, so that the terminal may perform cell-directed behaviors at least based on the frequency band indicators, or perform cell-directed behaviors based on the indication of the indication information, thereby avoiding the situation that a terminal which does not support an uplink carrier shift of 7.5 kHz accesses the LTE and NR coexistence network, and also avoiding large interference generated by a network side upon receiving.

Figure 2:
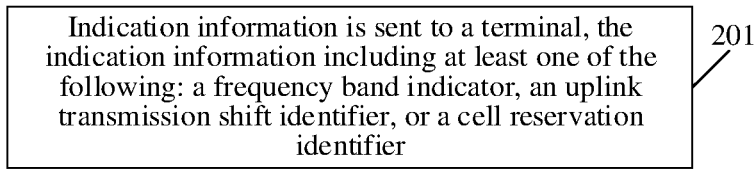
FIG. 2 is another schematic flowchart of a communication method according to an embodiment of the present disclosure.

An embodiment of the present disclosure also provides a communication method, which is applied to a network device. FIG. 2 is another schematic flowchart of a communication method according to an embodiment of the present disclosure. As shown in FIG. 2, the method includes the following operations.

In 201, indication information is sent to a terminal. The indication information includes at least one of the following: a frequency band indicator, an uplink transmission shift identifier, or a cell reservation identifier. The indication information is used for instructing the terminal to perform cell-directed behaviors. The cell reservation identifier is used for indicating whether a cell is reserved.

In the present embodiment, the frequency band indicator includes at least one of the following:
 a first frequency band indicator representing that a system operates in the frequency range and an uplink transmission shift is 0;
 a second frequency band indicator representing that the system operates in the frequency range and the uplink transmission shift is 7.5 kHz;
 a third frequency band indicator representing that the system operates in the frequency range and the uplink transmission shift is 7.5 kHz or 0; or
 a fourth frequency band indicator representing that the system operates in the frequency range.

In the present embodiment, the network device indicates different frequency band indicators for the same frequency range or overlapping frequency ranges. Different frequency ranges have different meanings. As an example, different frequency band indicators may be used to indicate whether the frequency range has an uplink transmission shift, so that after the network device sends the frequency band indicator to a terminal, the terminal may perform cell-directed behaviors at least based on the frequency band indicator.

In an alternative embodiment of the present disclosure, in a case that the frequency range corresponding to the frequency band indicator has an uplink transmission shift, the indication information further includes an uplink transmission shift identifier for indicating the uplink transmission shift, for example, indicating the uplink transmission with a 7.5 kHz shift.

In an alternative embodiment of the present disclosure, the operation of sending the frequency band indicator to the terminal includes that: the frequency band indicator is sent to the terminal through RRC signaling.

In an alternative embodiment of the present disclosure, in a case that the frequency band indicator includes the third frequency band indicator, the method further includes that: the network device sends configuration information to the terminal. The configuration information is used for indicating the uplink transmission with a 7.5 kHz shift or indicating that the uplink transmission shift is 0. Alternatively, the operation of sending the configuration information to the terminal includes that: the configuration information is sent to the terminal through RRC signaling.

According to the technical solutions of the embodiments of the present disclosure, indication information is sent to the terminal by the network device, and the indication information includes at least one of a frequency band indicator, an uplink transmission shift identifier, or a cell reservation identifier. Different frequency band indicators are indicated for the same frequency range or overlapping frequency ranges, and the different frequency band indicators may be used for indicating whether the frequency range has an uplink transmission shift, so that the terminal may perform cell-directed behaviors at least based on the frequency band indicator, or perform cell-directed behaviors based on the indication of the indication information, thereby avoiding the situation that a terminal which does not support an uplink carrier shift of 7.5 kHz accesses the LTE and NR coexistence network and also avoiding large interference generated by a network side upon receiving.

Figure 3:
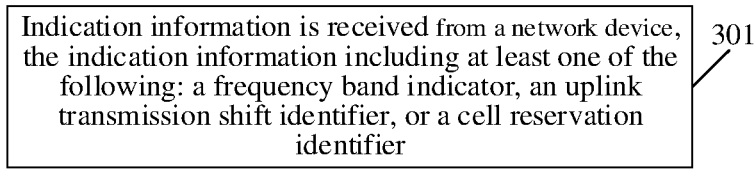
FIG. 3 is yet another schematic flowchart of a communication method according to an embodiment of the present disclosure.

An embodiment of the present disclosure also provides a communication method, which is applied to a terminal. FIG. 3 is yet another schematic flowchart of a communication method according to an embodiment of the present disclosure. As shown in FIG. 3, the method includes the following operations.

In 301, indication information is received from a network device. The indication information includes at least one of the following: a frequency band indicator, an uplink transmission shift identifier, or a cell reservation identifier. The indication information is used for instructing a terminal to perform cell-directed behaviors. The cell reservation identifier is used for indicating whether a cell is reserved.

In the present embodiment, the frequency band indicator includes at least one of the following:
- a first frequency band indicator representing that a system operates in the frequency range and an uplink transmission shift is 0;
- a second frequency band indicator representing that the system operates in the frequency range and the uplink transmission shift is 7.5 kHz;
- a third frequency band indicator representing that the system operates in the frequency range and the uplink transmission shift is 7.5 kHz or 0; or
- a fourth frequency band indicator representing that the system operates in the frequency range.

In the present embodiment, the network device indicates different frequency band indicators for the same frequency range or overlapping frequency ranges. Different frequency ranges have different meanings. As an example, different frequency band indicators may be used to indicate whether the frequency range has an uplink transmission shift, so that after the network device sends the frequency band indicator to a terminal, the terminal may perform cell-directed behaviors at least based on the frequency band indicator.

In an alternative embodiment of the present disclosure, in a case that the frequency range corresponding to the frequency band indicator has an uplink transmission shift, the indication information further includes an uplink transmission shift identifier for indicating the uplink transmission shift, for example, indicating the uplink transmission with a 7.5 kHz shift.

In an alternative embodiment of the present disclosure, the operation of receiving the indication information from the network device includes that: the indication information is received from the network device through RRC signaling.

In an alternative embodiment of the present disclosure, in a case that the frequency band indicator includes the third frequency band indicator, the method further includes that: configuration information sent by the network device is received. The configuration information is used for indicating the uplink transmission with a 7.5 kHz shift or indicating that the uplink transmission shift is 0. Alternatively, the operation of receiving the configuration information sent by the network device includes that: the configuration information is received from the network device through RRC signaling.

In an alternative embodiment of the present disclosure, the method further includes that one of the following behaviors is performed:
- in a case that the terminal does not support the frequency band indicator in the indication information, determining that a cell corresponding to the frequency band indicator is unable to be camped on; and
- in a case that the terminal supports the frequency band indicator in the indication information, determining whether to enable the uplink transmission shift based on information related to the uplink transmission shift in the indication information.

In the present embodiment, in a case that the terminal supports the frequency band indicator in the indication information, the operation that the terminal determines whether to enable the uplink transmission shift based on information related to the uplink transmission shift in the indication information at least includes the following two implementation modes.

As the first implementation mode, in a case that the terminal supports the frequency band indicator in the indication information and does not support the uplink transmission shift, one of the following behaviors is performed:
- when the indication information does not include the uplink transmission shift, performing uplink transmission with disabling the uplink transmission shift;
- when the indication information includes the uplink transmission shift, determining that a cell is unable to be camped on; and
- when the cell reservation identifier in the indication information represents that an identified cell is reserved, determining that the cell is unable to be camped on.

As the second implementation mode, in a case that the terminal supports the frequency band indicator in the indication information and supports the uplink transmission shift, one of the following behaviors is performed:
- when the indication information does not include the uplink transmission shift, performing uplink transmission with disabling the uplink transmission shift; and
- when the indication information includes the uplink transmission shift or the indication information includes the uplink transmission shift and the cell reservation identifier represents that an identified cell is reserved, performing an uplink shift of 7.5 kHz while performing uplink transmission.

In the present embodiment, on the one hand, the condition that the indication information includes the uplink transmission shift may be determined through the frequency band indicator in the indication information. For example, the second frequency band indicator, the third frequency band indicator and the like may indicate the uplink transmission shift. On the other hand, the condition that the indication information includes the uplink transmission shift may also be determined by the uplink transmission shift identifier in the indication information.

According to the technical solutions of the embodiments of the present disclosure, the indication information is sent to the terminal by the network device, and the indication information includes at least one of a frequency band indicator, an uplink transmission shift identifier, or a cell reservation identifier. Different frequency band indicators are indicated for the same frequency range or overlapping frequency ranges, and the different frequency band indicators may be used for indicating whether the frequency range has an uplink transmission shift, so that the terminal may perform cell-directed behaviors at least based on the frequency band indicator, or perform cell-directed behaviors based on the indication of the indication information, thereby avoiding the situation that a terminal which does not support an uplink carrier shift of 7.5 kHz accesses the LTE and NR coexistence network, and also avoiding large interference generated by a network side upon receiving.

The communication method of the embodiments of the present disclosure will be described below in detail with reference to specific examples.

Example 1

1. A network device indicates that a frequency band indicator of a frequency range is band A, and indicates that a frequency band indicator of the same frequency range is band A', which indicates that the uplink transmission of the frequency range has a 7.5 kHz shift.

2. The network device sends a frequency band indicator band A' to a terminal, which represents that there is an LTE and NR coexistence network, and the terminal may need to perform the uplink transmission shift of 7.5 kHz while performing uplink transmission.

3. If the terminal supports a frequency range in band A' and does not support the uplink transmission shift, i.e., the terminal does not support band A', the terminal determines that a cell cannot be camped on and the terminal cannot access the cell.

4. If the terminal supports the frequency range in band A' and supports the uplink transmission shift, the terminal performs the uplink transmission shift of 7.5 kHz while performing uplink transmission after receiving band A' sent by the network device.

Example 2

1. A network device indicates that a frequency band indicator of a frequency range is band A, and indicates that a frequency band indicator of the same frequency range is band A', which indicates that the uplink transmission of the frequency range has a 7.5 kHz shift.

2. The network device sends a frequency information identifier band A to a terminal, which represents that there is no LTE and NR coexistence network, and the terminal does not need to perform the uplink transmission shift of 7.5 kHz while performing uplink transmission.

3. If the terminal supports a frequency range in band A' and supports an uplink transmission shift and/or does not support an uplink transmission shift, i.e., the terminal supports band A or supports band A' or simultaneously supports band A and band A', the terminal does not perform the uplink transmission shift of 7.5 kHz while performing uplink transmission after receiving band A sent by the network device.

Example 3

1. A network device indicates that a frequency band indicator of a frequency range is band A, and indicates that a frequency band indicator of the same frequency range is band A', which indicates that the uplink transmission of the frequency range has a 7.5 kHz shift.

2. The network device sends a frequency information identifier band A' to the terminal, and simultaneously sends an uplink transmission shift identifier used for indicating the uplink transmission shift of 7.5 kHz. In an example, when the uplink transmission shift identifier is present, it may indicate that the uplink transmission with a 7.5 kHz shift is enabled. When the uplink transmission shift identifier is absent, it may indicate that the uplink transmission shift is disabled.

3. If the terminal supports a frequency range in band A' and does not support the uplink transmission shift, i.e., the terminal does not support band A', the terminal determines that a cell cannot be camped on and the terminal cannot access the cell.

4. If the terminal supports the frequency range in band A' and supports the uplink transmission shift, i.e., the terminal supports band A', the terminal performs the uplink transmission shift of 7.5 kHz while performing uplink transmission after receiving band A' sent by the network device.

Based on the present example, if the network device sends an uplink transmission shift identifier to the terminal and the uplink transmission shift identifier is used for indicating that an uplink transmission shift is 0, i.e., the uplink transmission shift is disabled, in a case that the terminal supports the uplink transmission shift and/or does not support the uplink transmission shift, the terminal does not perform the uplink transmission shift of 7.5 kHz while performing the uplink transmission.

Example 4

1. A network device indicates that a frequency band indicator of a frequency range is band A, and indicates that a frequency band indicator of the same frequency range is band A', which indicates that the uplink transmission of the frequency range has a 7.5 kHz shift.

2. The network device sends the following indication information to the terminal:
  a) an identifier band A of a certain frequency range;
  b) a cell reservation identifier, where the cell reservation identifier indicates that a cell is reserved;
  c) an uplink transmission shift identifier, where the uplink transmission shift identifier indicates the uplink transmission with a 7.5 kHz shift.

3. If a terminal supporting a frequency range in band A does not support the uplink transmission shift, it is determined that a cell is barred, and the terminal cannot access the cell. If the terminal supports the uplink transmission shift, the terminal performs the uplink transmission shift of 7.5 kHz while performing uplink transmission.

Based on the present example, if the cell reservation identifier is "not true", the terminal supporting the frequency range in band A determines whether to perform the uplink transmission shift according to the uplink transmission shift identifier.

Figure 4:
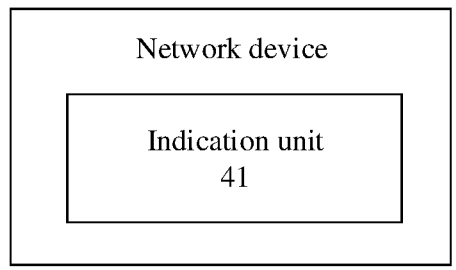
FIG. 4 is a first schematic composition structure diagram of a network device according to an embodiment of the present disclosure.

An embodiment of the present disclosure also provides a network device. FIG. 4 is a first schematic composition structure diagram of a network device according to an embodiment of the present disclosure. As shown in FIG. 4, the network device includes. an indication unit 41. The indication unit 41 is configured to indicate a frequency band indicator corresponding to a frequency range. The frequency band indicator includes at least one of the following: a first frequency band indicator representing that a system operates in the frequency range and an uplink transmission shift is 0; a second frequency band indicator representing that the system operates in the frequency range and the uplink transmission shift is 7.5 kHz; a third frequency band indicator representing that the system operates in the frequency range and the uplink transmission shift is 7.5 kHz or 0; or a fourth frequency band indicator representing that the system operates in the frequency range.

Figure 5:
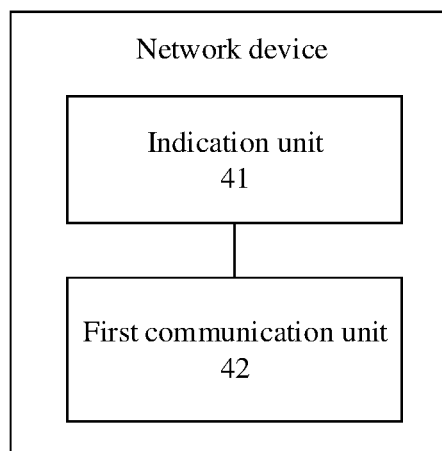
FIG. 5 is a second schematic composition structure diagram of a network device according to an embodiment of the present disclosure.

In an alternative embodiment of the present disclosure, as shown in FIG. 5, the network device further includes a first communication unit 42, configured to send the frequency band indicator to a terminal.

Alternatively, the first communication unit 42 is configured to send the frequency band indicator to the terminal through RRC signaling.

In an alternative embodiment of the present disclosure, the first communication unit 42 is configured to send configuration information to the terminal in a case that the frequency band indicator includes the third frequency band indicator. The configuration information is used for indicating the uplink transmission with a 7.5 kHz shift or indicating that the uplink transmission shift is 0.

Alternatively, the first communication unit 42 is configured to send the configuration information to the terminal through RRC signaling.

In the embodiments of the present disclosure, the indication unit 41 in the network device may be implemented by a Central Processing Unit (CPU), a Digital Signal Processor (DSP), a Microcontroller Unit (MCU) or a Field-Programmable Gate Array (FPGA) in the network device in practice. The first communication unit 42 in the network device may be implemented by a communication module (including basic communication suites, operating systems, communication modules, standardized interfaces and protocols, etc.) and a transceiver antenna in practice.

It should be noted that the network device provided by the above embodiment is only exemplified by the division of the above program modules when communicating. In practice, the above processing distribution may be performed by different program modules as required, i.e., the internal structure of the network device is divided into different program modules to complete all or part of the above processing. In addition, the network device provided by the above embodiment and the embodiments of the communication method belong to the same concept, and the detailed implementation process thereof is detailed in the method embodiments and will not be elaborated herein.

Figure 6:
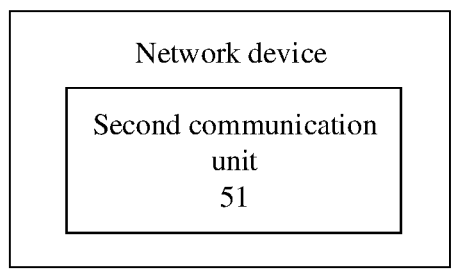
FIG. 6 is a third schematic composition structure diagram of a network device according to an embodiment of the present disclosure.

An embodiment of the present disclosure also provides a network device. FIG. 6 is a third schematic composition structure diagram of a network device according to an embodiment of the present disclosure. As shown in FIG. 6, the network device includes a second communication unit 51. The second communication unit 51 is configured to send indication information to a terminal. The indication information includes at least one of the following information: a frequency band indicator, an uplink transmission shift identifier, or a cell reservation identifier. The indication information is used for instructing the terminal to perform cell-directed behaviors.

In the present embodiment, the frequency band indicator includes at least one of the following: a first frequency band indicator representing that a system operates in the frequency range and an uplink transmission shift is 0; a second frequency band indicator representing that the system operates in the frequency range and the uplink transmission shift is 7.5 kHz; a third frequency band indicator representing that the system operates in the frequency range and the uplink transmission shift is 7.5 kHz or 0; or a fourth frequency band indicator representing that the system operates in the frequency range.

Alternatively, the second communication unit 51 is configured to send the indication information to the terminal through RRC signaling.

In an alternative embodiment of the present disclosure, the second communication unit 51 is further configured to send configuration information to the terminal in a case that the frequency band indicator includes the third frequency band indicator. The configuration information is used for indicating the uplink transmission with a 7.5 kHz shift or indicating that the uplink transmission shift is 0.

Alternatively, the second communication unit 51 is configured to send the configuration information to the terminal through RRC signaling.

In the embodiments of the present disclosure, the second communication unit 51 in the network device may be implemented by a communication module (including basic communication suites, operating systems, communication modules, standardized interfaces and protocols, etc.) and a transceiver antenna in practice.

It should be noted that the network device provided by the above embodiment is only exemplified by the division of the above program modules when communicating. In practice, the above processing distribution may be performed by different program modules as required, i.e., the internal structure of the network device is divided into different program modules to complete all or part of the above processing. In addition, the network device provided by the above embodiment and the embodiments of the communication method belong to the same concept, and the detailed implementation process thereof is detailed in the method embodiments and will not be elaborated herein.

Figure 7:
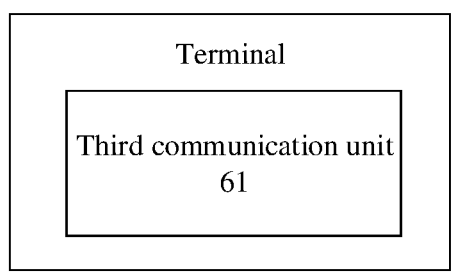
FIG. 7 is a first schematic composition structure diagram of a terminal according to an embodiment of the present disclosure.

An embodiment of the present disclosure also provides a terminal. FIG. 7 is a first schematic composition structure diagram of a terminal according to an embodiment of the present disclosure. As shown in FIG. 7, the terminal includes a third communication unit 61, configured to receive indication information sent by a network device. The indication information includes at least one of the following information: a frequency band indicator, an uplink transmission shift identifier, or a cell reservation identifier. The indication information is used for instructing a terminal to perform cell-directed behaviors.

In the present embodiment, the frequency band indicator includes at least one of the following: a first frequency band indicator representing that a system operates in the frequency range and an uplink transmission shift is 0; a second frequency band indicator representing that the system operates in the frequency range and the uplink transmission shift is 7.5 kHz; a third frequency band indicator representing that the system operates in the frequency range and the uplink transmission shift is 7.5 kHz or 0; or a fourth frequency band indicator representing that the system operates in the frequency range.

Alternatively, the third communication unit 61 is configured to receive the indication information sent by the network device through RRC signaling.

In an alternative embodiment of the present disclosure, the third communication unit 61 is further configured to receive configuration information sent by the network device in a case that the frequency band indicator includes the third frequency band indicator. The configuration information is used for indicating the uplink transmission with a 7.5 kHz shift or indicating that the uplink transmission shift is 0.

Alternatively, the third communication unit 61 is configured to receive the configuration information sent by the network device through RRC signaling.

Figure 8:
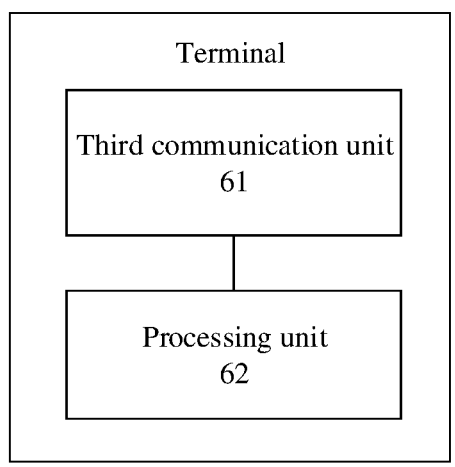
FIG. 8 is a second schematic composition structure diagram of a terminal according to an embodiment of the present disclosure.

In an alternative embodiment of the present disclosure, as shown in FIG. 8, the terminal further includes a processing unit 62. The processing unit 62 is configured to perform one of the following behaviors: in a case that the terminal does not support the frequency band indicator in the indication information, determining that a cell corresponding to the frequency band indicator is unable to be camped on; and in a case that the terminal supports the frequency band indicator in the indication information, determining whether to enable the uplink transmission shift based on information related to the uplink transmission shift in the indication information.

As an implementation mode, the processing unit 62 is configured to perform one of the following behaviors in a case that the terminal supports the frequency band indicator in the indication information and does not support the uplink transmission shift: when the indication information does not include the uplink transmission shift, performing uplink transmission with disabling the uplink transmission shift; when the indication information includes the uplink transmission shift, determining that a cell is unable to be camped on; and when the cell reservation identifier in the indication information represents that an identified cell is reserved, determining that the cell is unable to be camped on.

As another implementation mode, the processing unit 62 is configured to perform one of the following behaviors in a case that the terminal supports the frequency band indicator in the indication information and supports the uplink transmission shift: when the indication information does not include the uplink transmission shift, performing uplink transmission with disabling the uplink transmission shift; and when the indication information includes the uplink transmission shift or the indication information includes the uplink transmission shift and the cell reservation identifier represents that an identified cell is reserved, performing an uplink shift of 7.5 kHz while performing uplink transmission.

In the embodiments of the present disclosure, the processing unit 62 in the terminal may be implemented by a CPU, a DSP, an MCU or an FPGA in the terminal in practice. The third communication unit 61 in the network device may be implemented by a communication module (including basic communication suites, operating systems, communication modules, standardized interfaces and protocols, etc.) and a transceiver antenna in practice.

It should be noted that the terminal provided by the above embodiment is only exemplified by the division of the above program modules when communicating. In practice, the above processing distribution may be performed by different program modules as required, i.e., the internal structure of the terminal is divided into different program modules to complete all or part of the above processing. In addition, the terminal provided by the above embodiment and the embodiments of the communication method belong to the same concept, and the detailed implementation process thereof is detailed in the method embodiments and will not be elaborated herein.

Figure 9:
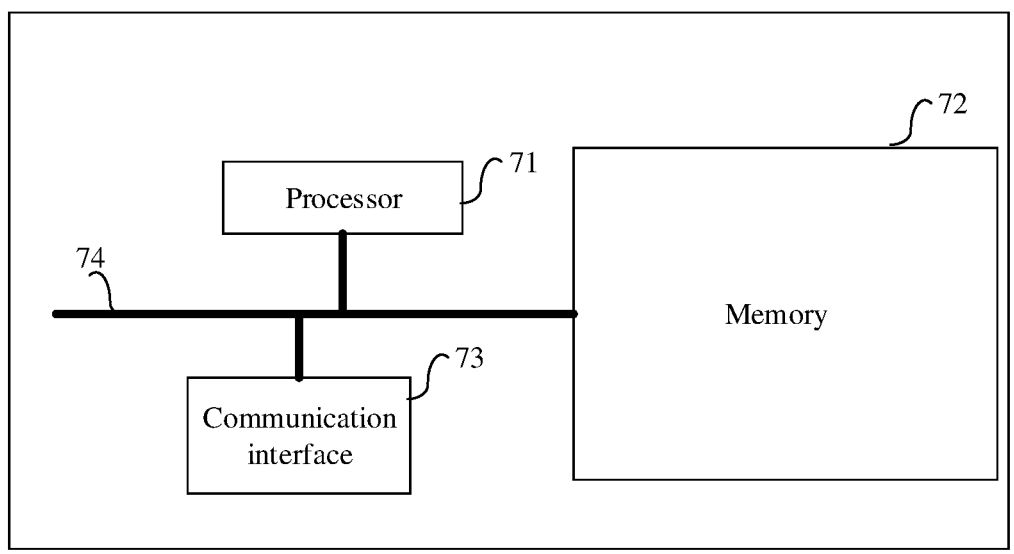
FIG. 9 is a schematic hardware composition structure diagram of a communication device according to an embodiment of the present disclosure.

An embodiment of the present disclosure also provides a communication device. FIG. 9 is a schematic hardware composition structure diagram of a communication device according to an embodiment of the present disclosure. As shown in FIG. 9, the communication device includes a memory 72, a processor 71, and a computer program stored on the memory 72 and operable on the processor 71. Alternatively, the communication device is a network device, and the processor, when executing the program, implements the operations of the communication method, applied to the network device, of the embodiments of the present disclosure. Alternatively, the communication device is a terminal, and the processor, when executing the program, performs the operations of the communication method, applied to the terminal, of the embodiments of the present disclosure.

It is to be appreciated that the communication device also includes a communication interface 73. The various components in the communication device may be coupled together by a bus system 74. It is to be appreciated that the bus system 74 is configured to implement connection communication between the components. The bus system 74 includes a data bus, and further includes a power bus, a control bus, and a status signal bus. However, for the sake of clarity, various buses are marked as the bus system 74 in FIG. 9.

It is to be appreciated that the memory 72 may be a volatile memory or a non-volatile memory, or may include both volatile and non-volatile memories. The non-volatile memory may be a Read Only Memory (ROM), a Programmable ROM (PROM), an Erasable PROM (EPROM), an Electrically EPROM (EEPROM), a Ferromagnetic Random Access Memory (FRAM), a flash memory, a magnetic surface memory, an optical disk, or a Compact Disc-ROM (CD-ROM). The magnetic surface memory may be a magnetic disk memory or a magnetic tape memory. The volatile memory may be a Random Access Memory (RAM), which is used as an external cache. It is exemplarily but unlimitedly described that RAMs in various forms may be adopted, such as a Static RAM (SRAM), a Synchronous SRAM (SSRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM), and a Direct Rambus RAM (DRRAM). The memory 72 described in the embodiments of the present disclosure is intended to include, but not limited to, memories of these and any other suitable type.

The methods disclosed in the embodiments of the present disclosure described above may be applied to the processor 71 or implemented by the processor 71. The processor 71 may be an integrated circuit chip with signal processing capabilities. In an implementation process, each operation of the above methods may be completed by an integrated logic circuit of hardware in the processor 71 or an instruction in a software form. The processor 71 described above may be a general processor, a DSP, or other programmable logic devices, discrete gates or transistor logic devices, discrete hardware components, etc. Various methods, operations, and logic block diagrams disclosed in the embodiments of the present disclosure may be implemented or executed by the processor 71. The general processor may be a microprocessor or any conventional processor, etc. The operations of the method disclosed in combination with the embodiments of the present disclosure may be directly embodied to be executed and completed by a hardware decoding processor, or executed and completed by a combination of hardware and software modules in the decoding processor. The software module may be located in a storage medium, which is located in the memory 72, and the processor 71 reads information in the memory 72, and completes the operations of the foregoing methods in combination with hardware.

An embodiment of the present disclosure also provides a communication system, which includes a network device and a terminal. The terminal may be used for realizing corresponding functions realized by the terminal in the above method, and the network device may be used for realizing corresponding functions realized by the network device in the above method. For brevity, descriptions thereof are omitted herein.

The technical solutions of the embodiments of the present disclosure may be applied to various communication systems, such as a Global System of Mobile communication (GSM), an LTE system or a 5G system. The 5G system may also be referred to as an NR system. The network device may be an access network device in the communication system, such as a base station in each communication system. The terminal in the present embodiments may be referred to as a wireless communication terminal, a wireless terminal or a mobile terminal, etc. It is to be appreciated that examples of the terminal include, but are not limited to, various types of telephones, vehicle-mounted devices, wearable devices, etc.

An embodiment of the present disclosure also provides a computer-readable storage medium, which has a computer program stored thereon that, when executed by a processor, implements operations of a scrambling information processing method applied to a network device according to the embodiments of the present disclosure, or implements operations of a scrambling information processing method applied to a terminal according to the embodiments of the present disclosure.

The methods disclosed in the several method embodiments provided by the present disclosure may be combined arbitrarily without conflict to obtain a new method embodiment.

The features disclosed in the several product embodiments provided by the present disclosure may be combined arbitrarily without conflict to obtain a new product embodiment.

The features disclosed in the several method or device embodiments provided by the present disclosure may be combined arbitrarily without conflict to obtain a new method or device embodiment.

In some embodiments provided by the present disclosure, it should be understood that the disclosed device and method may be implemented in another manner. The device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between displayed or discussed components may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part of all of the units may be selected according to a practical requirement to achieve the purposes of the solutions of the embodiments.

In addition, each functional unit in each embodiment of the present disclosure may be integrated into a processing unit, each unit may also serve as an independent unit and two or more than two units may also be integrated into a unit. The integrated unit may be implemented in a hardware form and may also be implemented in form of hardware and software functional unit.

Those of ordinary skill in the art can understand that all or part of the operations of the above method embodiments may be completed by related hardware instructed through a program, the program may be stored in a computer-readable storage medium, and the program is executed to execute the operations of the method embodiments. The storage medium includes: various media capable of storing program codes such as a mobile storage device, a ROM, a RAM, a magnetic disk, or an optical disk.

Or, when being implemented in form of software function module and sold or used as an independent product, the integrated unit of the disclosure may also be stored in a computer-readable storage medium. Based on such an understanding, the technical solutions of the embodiments of the disclosure substantially or parts making contributions to the conventional art may be embodied in form of software product, and the computer software product is stored in a storage medium, including a plurality of instructions configured to enable a computer device (which may be a personal computer, a server, a network device or the like) to execute all or part of the method in each embodiment of the disclosure. The storage medium includes various media capable of storing program codes such as a mobile hard disk, a ROM, a magnetic disk, or an optical disc.

The above is only the specific implementation modes of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A communication method, performed by a network device, the method comprising:
    sending indication information to a terminal, the indication information comprising a frequency band indicator corresponding to a frequency range, an uplink transmission shift identifier, and a cell reservation identifier, wherein a same frequency range is indicated by different frequency band indicators, wherein the cell reservation identifier indicates whether a cell is reserved,
    the method further comprising the indication information instructing the terminal to perform cell-directed behaviors and to determine the following:
        when the terminal does not support the frequency band indicator in the indication information, determine that the cell is barred, and
        when the terminal supports the frequency band indicator in the indication information, determine whether to enable an uplink transmission shift as indicated by the uplink transmission shift identifier,
    wherein the frequency band indicators comprise at least one of the following:
        a first frequency band indicator, the first frequency band indicator representing that a system operates in the frequency range and the uplink transmission shift is 0 KHz;
        a second frequency band indicator, the second frequency band indicator representing that the system operates in the frequency range and the uplink transmission shift is 7.5 kHz; or
        a third frequency band indicator, the third frequency band indicator representing that the system operates in the frequency range and the uplink transmission shift is 7.5 kHz or 0 KHz.

2. The method according to claim 1, wherein sending the indication information to the terminal comprises:
    sending the indication information to the terminal through Radio Resource Control (RRC) signaling.

3. The method according to claim 1, wherein in a case that the frequency band indicators comprise the third frequency band indicator, the method further comprises:
  sending configuration information to the terminal, the configuration information being used for indicating that the uplink transmission shift is 7.5 kHz or indicating that the uplink transmission shift is 0 KHz.

4. A communication method, performed by a terminal, the method comprising:
  receiving indication information from a network device, the indication information comprising a frequency band indicator corresponding to a frequency range, an uplink transmission shift identifier, and a cell reservation identifier, the indication information being used for instructing the terminal to perform cell-directed behaviors, the cell reservation identifier indicating whether a cell is reserved, wherein a same frequency range is indicated by different frequency band indicators, the frequency band indicators comprising at least one of the following:
    a first frequency band indicator, the first frequency band indicator representing that a system operates in the frequency range and an uplink transmission shift is 0 KHz;
    a second frequency band indicator, the second frequency band indicator representing that the system operates in the frequency range and the uplink transmission shift is 7.5 kHz; or
    a third frequency band indicator, the third frequency band indicator representing that the system operates in the frequency range and the uplink transmission shift is 7.5 kHz or 0 KHz;
  wherein the method further comprises:
    in a case that the terminal does not support the frequency band indicator in the indication information, determining that the cell is barred; and
    in a case that the terminal supports the frequency band indicator in the indication information, determining whether to enable the uplink transmission shift as indicated by the uplink transmission shift identifier.

5. The method according to claim 4, wherein receiving the indication information from the network device comprises:
  receiving the indication information from the network device through Radio Resource Control (RRC) signaling.

6. The method according to claim 4, wherein in a case that the frequency band indicators comprise the third frequency band indicator, the method further comprises:
  receiving configuration information from the network device, the configuration information being used for indicating that the uplink transmission shift is 7.5 kHz or indicating that the uplink transmission shift is 0 KHz.

7. The method according to claim 6, wherein receiving, by the terminal, the configuration information from the network device comprises:
  receiving the configuration information from the network device through Radio Resource Control (RRC) signaling.

8. The method according to claim 4, wherein in a case that the terminal supports the frequency band indicator in the indication information and does not support the uplink transmission shift, one of the following actions is performed:
  when the indication information does not comprise the uplink transmission shift, performing uplink transmission with disabling the uplink transmission shift;
  when the indication information comprises the uplink transmission shift, determining that the cell is barred; and
  when the cell reservation identifier in the indication information represents that an identified cell is reserved, determining that the cell is barred.

9. The method according to claim 4, wherein in a case that the terminal supports the frequency band indicator in the indication information and supports the uplink transmission shift, one of the following actions is performed:
  when the indication information does not comprise the uplink transmission shift, performing uplink transmission with disabling the uplink transmission shift; and
  when the indication information comprises the uplink transmission shift or the indication information comprises the uplink transmission shift and the cell reservation identifier represents that the cell is reserved, performing an uplink shift of 7.5 kHz while performing uplink transmission.

10. A terminal, comprising: a memory, a processor, and a computer program stored on the memory and operable on the processor, wherein the processor, when executing the computer program, implements operations of the method according to claim 4.

11. A network device, comprising: a memory, a processor, and a computer program stored on the memory and operable on the processor, wherein the processor, when executing the computer program, implements operations of the method according to claim 1.

* * * * *